US012370661B1

(12) United States Patent
Lin

(10) Patent No.: US 12,370,661 B1
(45) Date of Patent: Jul. 29, 2025

(54) HAMMER TACKER

(71) Applicant: APEX MFG. CO., LTD., Taichung (TW)

(72) Inventor: Chih-Yung Lin, Taichung (TW)

(73) Assignee: APEX MFG. CO., LTD., Taichung (TW)

( * ) Notice: Subject to any disclaimer, the term of this patent is extended or adjusted under 35 U.S.C. 154(b) by 0 days.

(21) Appl. No.: 18/795,595

(22) Filed: Aug. 6, 2024

(30) Foreign Application Priority Data

Jul. 18, 2024 (TW) ................................ 113126920

(51) Int. Cl.
*B25C 5/11* (2006.01)

(52) U.S. Cl.
CPC .................................... *B25C 5/11* (2013.01)

(58) Field of Classification Search
CPC .............. B25C 5/06; B25C 5/11; B25D 1/005
See application file for complete search history.

(56) References Cited

U.S. PATENT DOCUMENTS 2,524,061 A * 10/1950 Lindstrom ............. B25D 1/005 227/127
2,552,798 A * 5/1951 Lindstrom ............. B25D 1/005 227/133
2,896,210 A * 7/1959 Rubin .................... B25D 1/005 227/133
5,975,401 A * 11/1999 Fealey ...................... B25C 5/11 227/147
6,012,623 A * 1/2000 Fealey ...................... B25C 5/11 227/139
D561,550 S * 2/2008 Krushlin .......................... D8/49
7,975,892 B2 * 7/2011 Yeh ....................... B25C 5/1613 227/133
8,074,854 B2 * 12/2011 Hu ............................ B25C 5/06 227/8
9,776,313 B2 * 10/2017 Hu ............................ B25F 5/02
10,093,009 B2 * 10/2018 Hu ........................ B25C 5/1613
10,730,173 B2 * 8/2020 Pelletier ..................... B25C 5/11
11,325,234 B2 * 5/2022 Hu ........................ B25C 5/1617
2006/0253996 A1 * 11/2006 Bianco ...................... B25C 5/11 7/158
2010/0001033 A1 * 1/2010 Chen ......................... B25C 5/11 340/815.45
2011/0248066 A1 * 10/2011 Hu ............................ B25C 5/16 227/127

(Continued)

*Primary Examiner* — Thanh K Truong
*Assistant Examiner* — David G Shutty
(74) *Attorney, Agent, or Firm* — MUNCY, GEISSLER, OLDS & LOWE, P.C.

(57) ABSTRACT

A hammer tacker is provided, wherein the hammer tacker includes: a main body integrally made of plastic and including two side walls and a top wall, each side wall including an ear portion which includes a stop point, a first position and a second position between two ends of each side wall and the stop point, each side wall being gradually thicker from the first position to the stop point, from the second position to the stop point, and from the top wall to the stop point; and a striking mechanism rotatably connected to the two side walls and swingable to abut against the stop point, including a magazine and a striking member, the magazine being disposed between the two side walls and movable relative to the main body, movably located above the magazine, and being configured to strike a staple out from the magazine.

10 Claims, 7 Drawing Sheets

(56) References Cited

U.S. PATENT DOCUMENTS

| | | | | |
|---|---|---|---|---|
| 2017/0190039 | A1* | 7/2017 | Burch | B25C 5/0285 |
| 2017/0225310 | A1* | 8/2017 | Huang | B25C 5/11 |
| 2021/0316434 | A1* | 10/2021 | Wang | B25C 5/06 |

* cited by examiner

HAMMER TACKER

BACKGROUND OF THE INVENTION

Field of the Invention

The present invention relates to a hammer tacker.

Description of the Prior Art

Generally, a hammer tacker includes a shell having opposing side walls and a striking mechanism housed therein. The side walls are mostly formed from a metal plate by folding and punching, which limits the shape of the shell due to the difficulty of processing the metal plate. Thus, only rough shapes can usually be formed, and the striking mechanism must be positioned by using additional fixation components. Additionally, the metal plate is quite heavy, imposing a significant burden on the user.

Some conventional hammer tackers are provided with a shell of plastic or composite materials for reducing the overall weight; however, the connecting and adjacent portions of the shell which are connected to the striking mechanism and receive the great impact during hammering are prone to cracking or breaking.

The present invention is, therefore, arisen to obviate or at least mitigate the above-mentioned disadvantages.

SUMMARY OF THE INVENTION

The main object of the present invention is to provide a hammer tacker which has advantages of lightweight, high structural strength and durability To achieve the above and other objects, a hammer tacker is provided, wherein the hammer tacker includes: a main body integrally made of plastic material and including two side walls and a top wall connected between the two side walls, each of the two side walls including an ear portion which includes a stop point, a first position and a second position being respectively defined between two ends of each of the two side walls and the stop point, each of the two side walls being gradually thicker from the first position to the stop point, being gradually thicker from the second position to the stop point, and being gradually thicker from the top wall to the stop point; and a striking mechanism rotatably connected to the two side walls and swingable to abut against the stop point, and including a magazine and a striking member, the magazine being disposed between the two side walls and movable relative to the main body, the striking member being movably located above the magazine, the striking member being configured to strike a staple out from the magazine.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
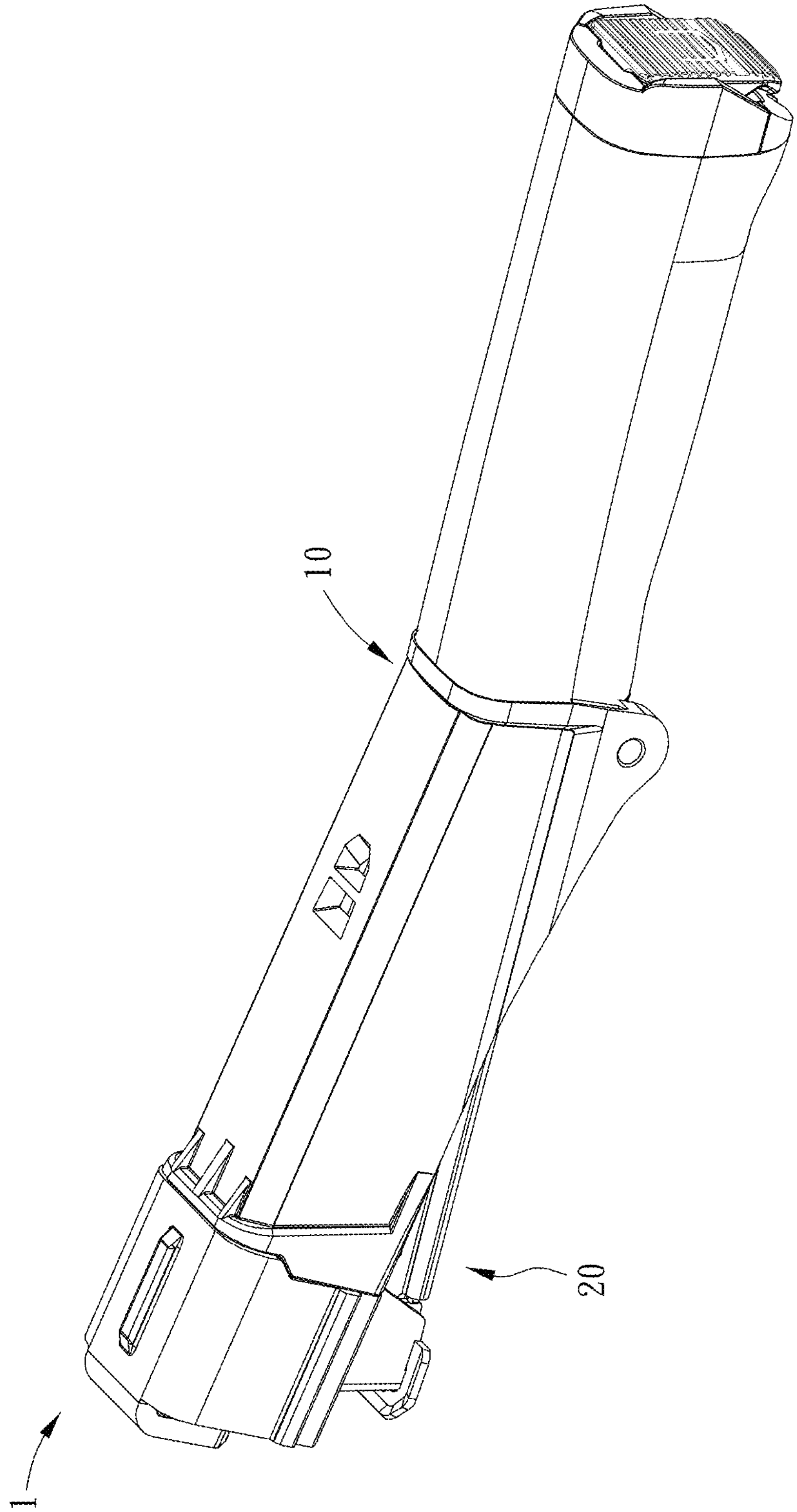
FIG. 1 is a perspective view of an exemplary embodiment of the present invention.
Figure 2:
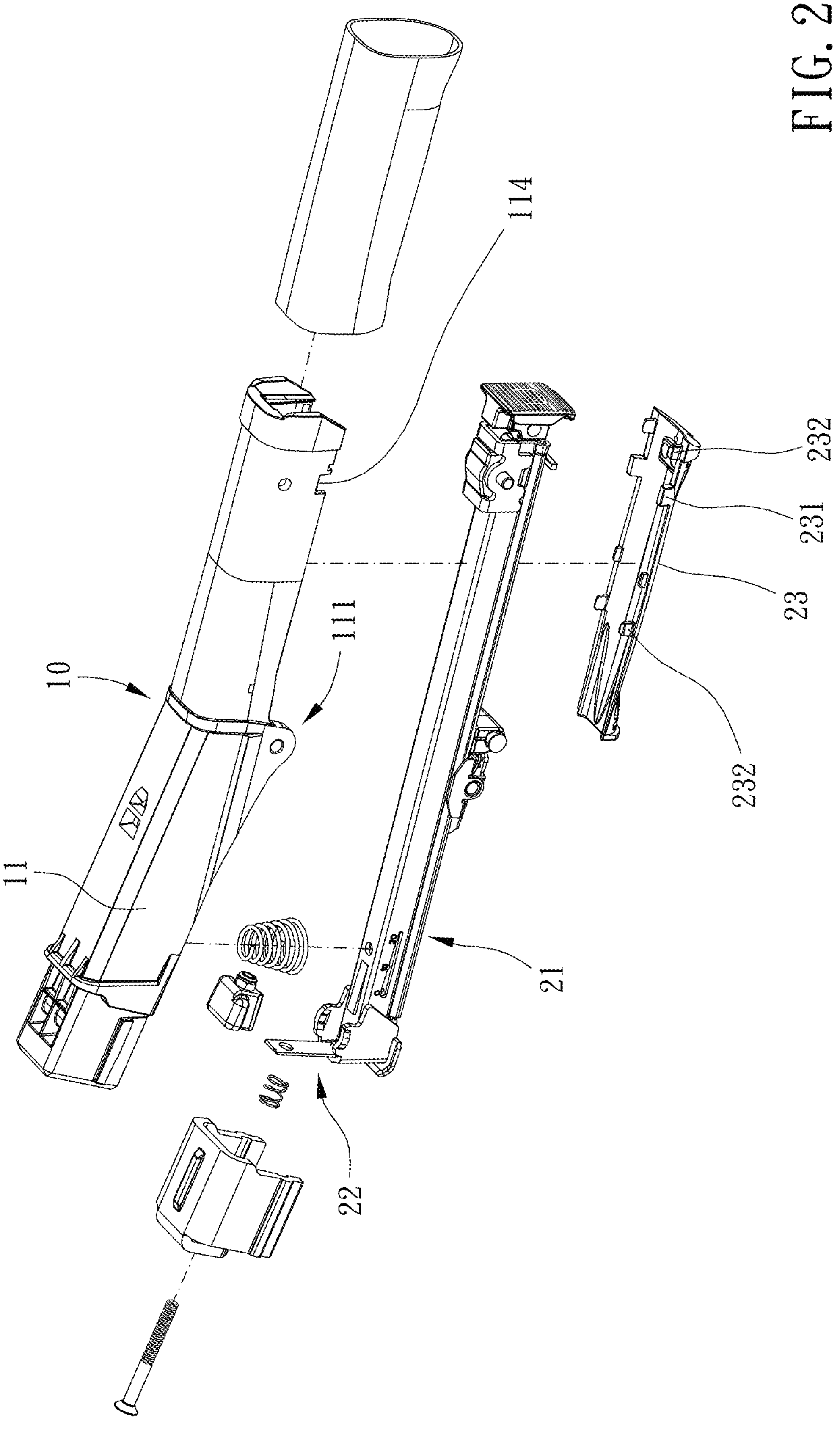
FIG. 2 is an exploded view of an exemplary embodiment of the present invention.
Figure 3:
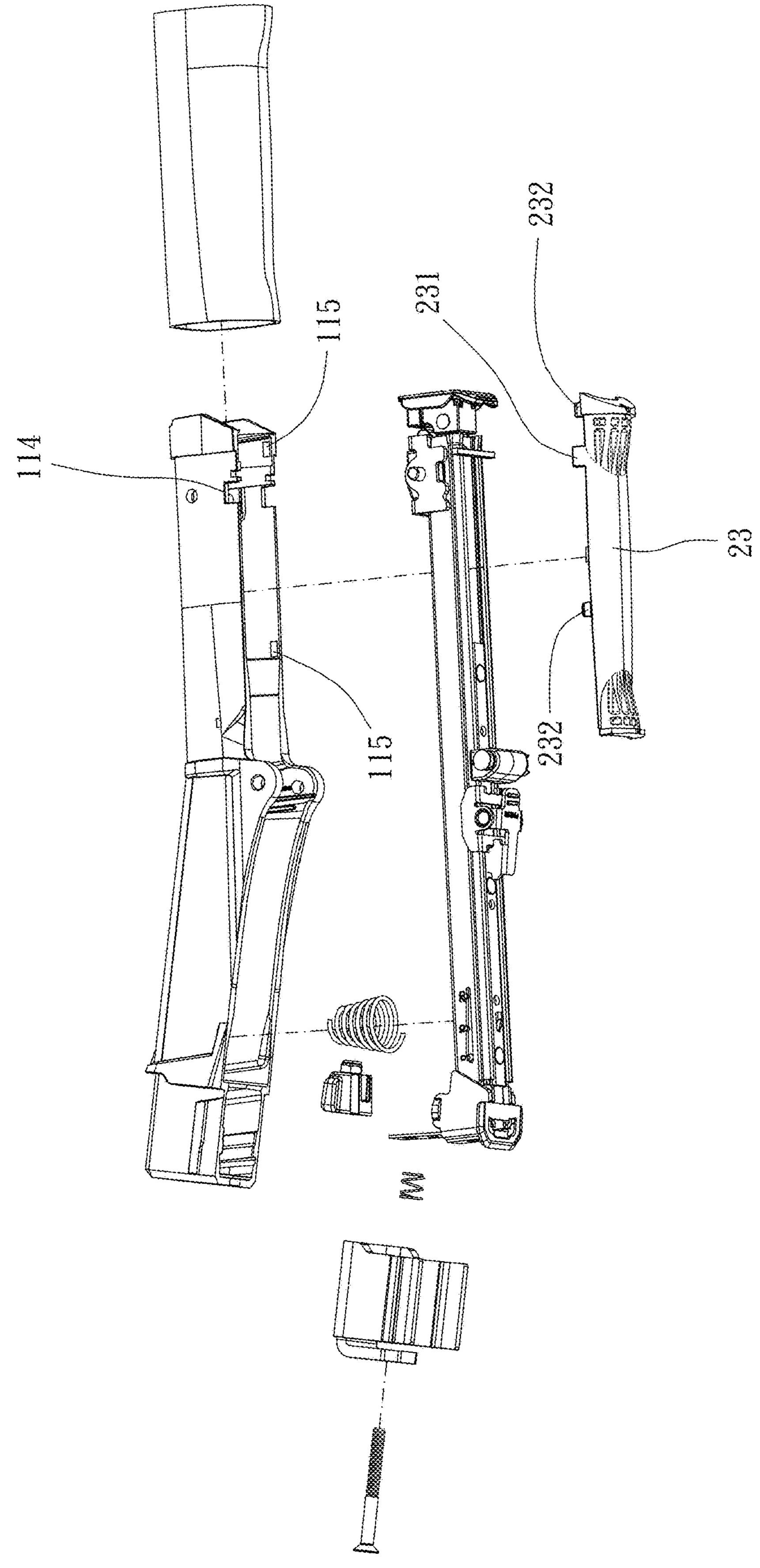
FIG. 3 is another exploded view of an exemplary embodiment of the present invention.
Figure 4:
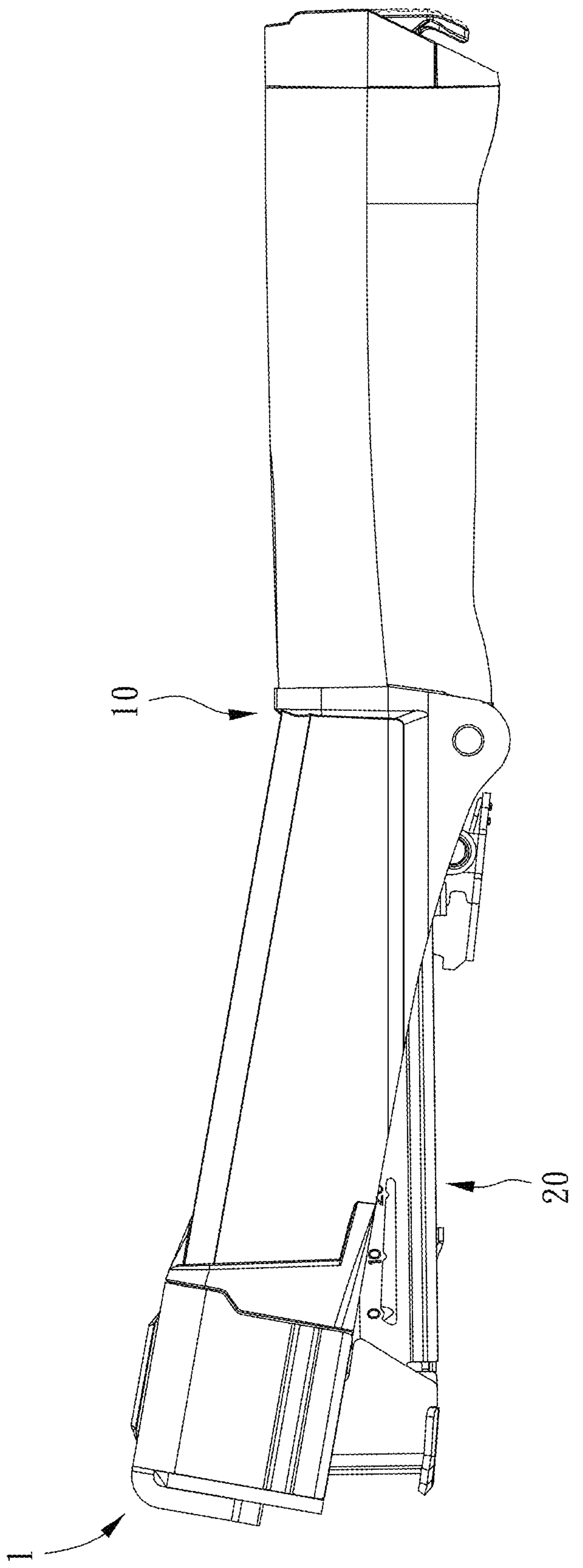
FIG. 4 is a side view of an exemplary embodiment of the present invention.
Figure 5:
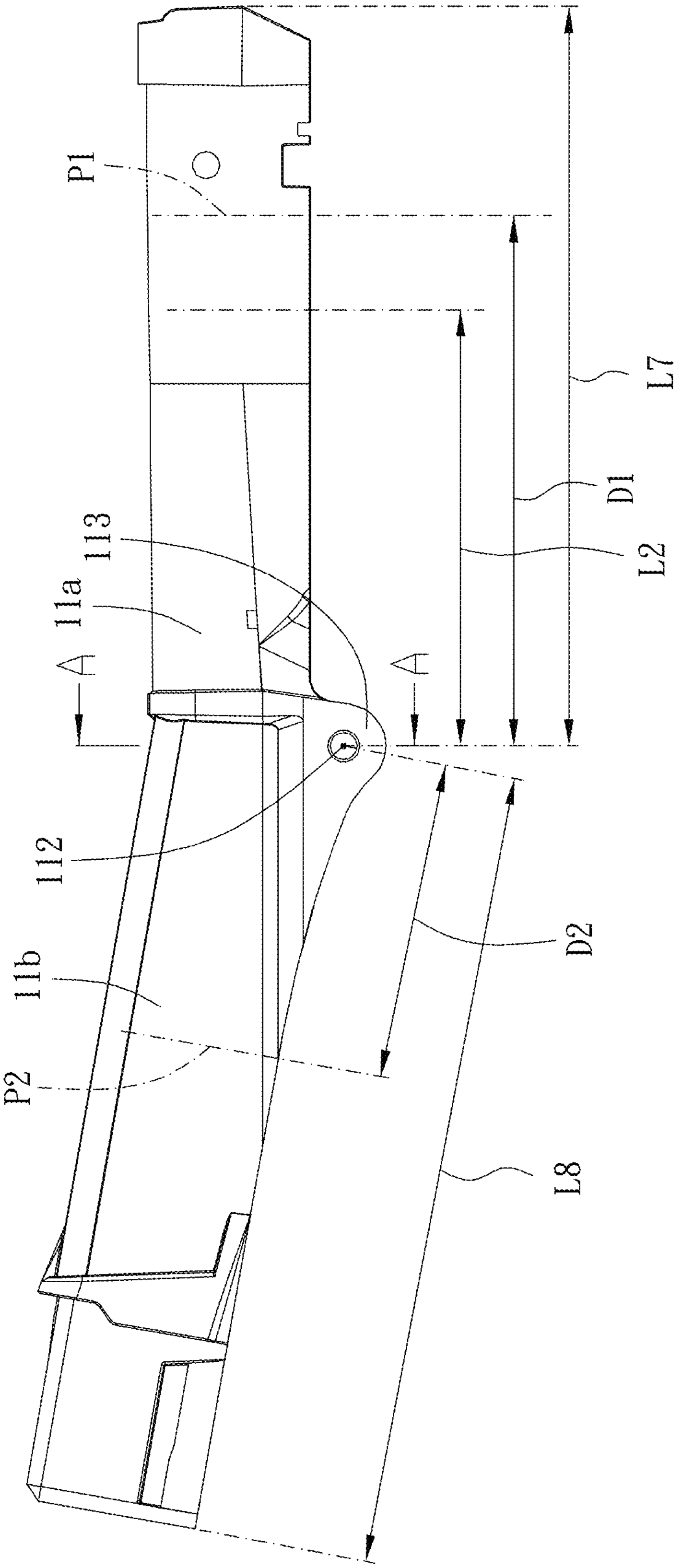
FIG. 5 is a side view of a main body of an exemplary embodiment of the present invention.
Figure 6:
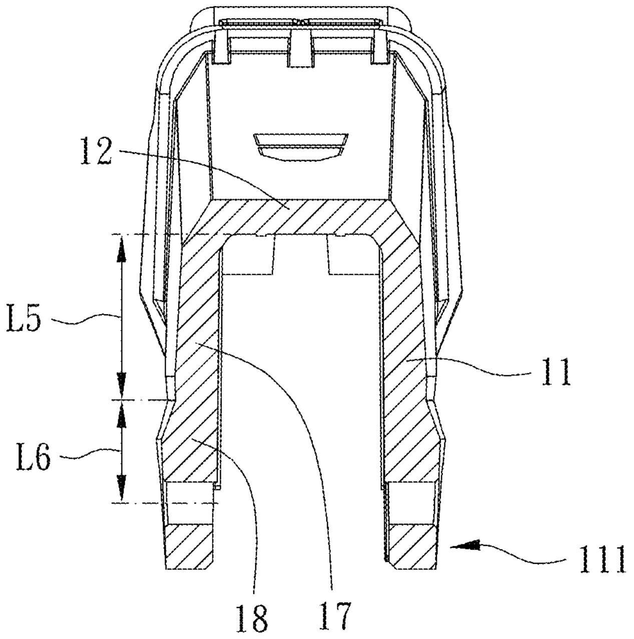
FIG. 6 is a sectional view of the main body of an exemplary embodiment of the present invention.
Figure 7:
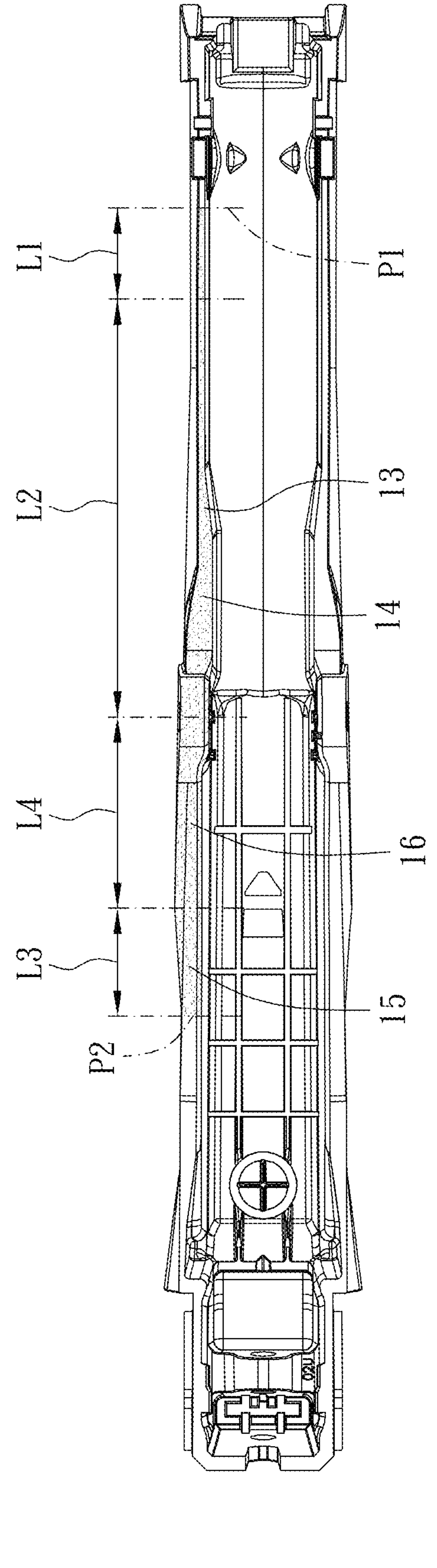
FIG. 7 is a bottom view of the main body of an exemplary embodiment of the present invention.

Please refer to FIGS. 1 to 7 for an exemplary embodiment of the present invention. A hammer tacker 1 of the present invention includes a main body 10 and a striking mechanism 20.

The main body 10 is integrally made of plastic material, and includes two side walls 11 and a top wall 12 connected between the two side walls 11. Each of the two side walls 11 includes an ear portion 111 which includes a stop point 112. A first position P1 and a second position P2 are defined between two ends of each of the two side walls 11 and the stop point 112. Each of the two side walls 11 is gradually thicker from the first position P1 to the stop point 112, gradually thicker from the second position P2 to the stop point 112, and gradually thicker from the top wall 12 to the stop point 112. The striking mechanism 20 is rotatably connected to the two side walls 11 and swingable to abut against the stop point 112. The striking mechanism 20 includes a magazine 21 and a striking member 22. The magazine 21 is movable relative to the main body 10 and located between the two side walls 11. The striking member 22 is movably located above the magazine 21 and configured to strike a staple out from the magazine 21. Thus, the hammer tacker 1 has advantages such as lightweight, high structural strength, and durability.

In this embodiment, the main body 10 may be integrally formed of a single plastic material free of containing fibers, or may be integrally formed of plastic materials free of containing fibers. For example, the main body 10 may be integrally formed of polymer plastics and composite materials, which provides the advantages of environmental friendliness and lightweight. The overall structure can be designed based on ergonomic analysis for optimal force distribution and weight balance, considering the usage habits of different regions. The grip force analysis helps to design localized reinforcements. Additionally, the overall structure is designed to meet the force requirements of different regions to control the thickness ratio and operating center of gravity, and this results in comfortable operation, efficient hammering, and strong structure.

During operation, the main body 10 and the striking mechanism 20 move relatively closer, the stop point 112 can limit their relative movement distance so that it prevents excessive swing and reduces impact on the main body 10, thus avoiding structural damage. The stop point 112 may be provided with a pin inserted between the two side walls 11, a stop block integrally extending from the two side walls 11, or any component or structure which is configured to stop the striking mechanism 20.

Preferably, each of the two side walls 11 has a maximum thickness at a portion adjacent to the stop point 112. Each ear portion 111 further includes an arched convex 113 extending in a direction away from the top wall 12 and around the stop point 112. The arched convex 113 has a thickness larger than a portion of the side wall 11 connected to the top wall 12. This enhances the structural strength at the connection and adjacent portions of the striking mechanism 20, which avoids cracking or breaking during hammering.

Specifically, each of the two side walls 11 further includes a first thickening section 13 with thickness gradually increasing from the first position P1 towards the stop point 112, a second thickening section 14 with thickness gradually increasing from the first thickening section 13 to the stop point 112, a third thickening section 15 with thickness gradually increasing from the second position P2 towards the stop point 112, a fourth thickening section 16 with thickness gradually increasing from the third thickening section 15 to the stop point 112, a fifth thickening section 17 with thickness gradually increasing from the top wall 12 towards the stop point 112, and a sixth thickening section 18 with thickness gradually increasing from the fifth thickening section 17 to the stop point 112. Each of the two side walls 11 gradually thickens in different directions, thus evenly distributing and transmitting the force and avoiding stress concentration points (breakage points).

Preferably, an extent L2 of the second thickening section 14 is larger than an extent L1 of the first thickening section 13, an extent L4 of the fourth thickening section 16 is larger than an extent L3 of the third thickening section 15, and an extent L5 of the fifth thickening section 17 is larger than an extent L6 of the sixth thickening section 18. This provides maximum structural strength at the connection and adjacent portions of each of the two side walls 11 and the striking mechanism 20, which can avoid cracking or breaking.

In this embodiment, each of the two side walls 11 is divided by the stop point 112 into a first section 11*a* and a second section 11*b*. The first section 11*a* is the handle side, and the second section 11*b* is the working side. A ratio of a first distance D1 from the first position P1 to the stop point 112 to a length L7 of the first section 11*a* is 0.615 to 0.815, and a ratio of a second distance D2 from the second position P2 to the stop point 112 to a length L8 of the second section 11*b* is 0.305 to 0.505. These values can be varied based on ergonomic and force distribution considerations, as well as user habits in different areas or countries.

Preferably, the main body 10 further includes at least one notch 114 formed on at least one of the side walls 11. The striking mechanism 20 further includes a bottom plate 23 located at an underside of the magazine 21, and the bottom plate 23 includes at least one projection 231 inserted in the at least one notch 114, so that it prevents relative forward and backward movement between the main body 10 and the striking mechanism 20. The main body 10 further includes at least one recess 115 on an inner surface of at least one of the side walls 11, and the bottom plate 23 further includes at least one protrusion 232 engaged within the at least one recess 115, which enhances the stability, strength, and reliability of the connection between the main body 10 and the striking mechanism 20.

The main body 10 is, for example, made of PC material and appropriately thickened, which can effectively increase the structural strength of the main body 10. For example, in a test where one end of the main body 10 was fixed and a force of 50 kgf was applied to the other end, the deformation displacement of the other end of the main body 10 is approximately 25.8 mm. Under the same test conditions, the deformation displacement of the main body of a conventional hammer tacker without thickening, when subjected to a force of 50 kgf, is approximately 44.7 mm. It is obvious that the structural strength of the main body 10 of the present invention can be significantly enhanced through appropriate thickening.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A hammer tacker including:

a main body integrally made of plastic material and including two side walls and a top wall connected between the two side walls, each of the two side walls including an ear portion which includes a stop point, a first position and a second position being respectively defined between two ends of each of the two side walls and the stop point, each of the two side walls being gradually thicker from the first position to the stop point, being gradually thicker from the second position to the stop point, and being gradually thicker from the top wall to the stop point; and a striking mechanism rotatably connected to the two side walls and swingable to abut against the stop point, and including a magazine and a striking member, the magazine being disposed between the two side walls and movable relative to the main body, the striking member being movably located above the magazine, the striking member being configured to strike a staple out from the magazine.

2. The hammer tacker of claim 1, wherein the main body is integrally formed of a single plastic material free of containing fibers.

3. The hammer tacker of claim 1, wherein the main body is integrally formed of plastic materials free of containing fibers.

4. The hammer tacker of claim 2, wherein each of the two side walls has a maximum thickness at a portion adjacent to the stop point.

5. The hammer tacker of claim 4, wherein the ear portion of each of the two side walls further includes an arched convex element extending in a direction away from the top wall and around the stop point, and the arched convex element has a thickness larger than a thickness of a portion of the side wall connected to the top wall.

6. The hammer tacker of claim 1, wherein each of the two side walls includes a first thickening section with thickness gradually increasing from the first position towards the stop point, a second thickening section with thickness gradually increasing from the first thickening section to the stop point, a third thickening section with thickness gradually increasing from the second position towards the stop point, a fourth thickening section with thickness gradually increasing from the third thickening section to the stop point, a fifth thickening section with thickness gradually increasing from the top wall towards the stop point, and a sixth thickening section with thickness gradually increasing from the fifth thickening section to the stop point.

7. The hammer tacker of claim 6, wherein an extent of the second thickening section is larger than an extent of the first thickening section, an extent of the fourth thickening section is larger than an extent of the third thickening section, and an extent of the fifth thickening section is larger than an extent of the sixth thickening section.

8. The hammer tacker of claim 1, wherein the main body further includes at least one notch formed on at least one of the two side walls, and the striking mechanism further includes a bottom plate located at an underside of the magazine, and the bottom plate includes at least one projection inserted in the at least one notch.

9. The hammer tacker of claim 8, wherein the main body further includes at least one recess on an inner surface of at least one of the two side walls, and the bottom plate further includes at least one protrusion engaged within the at least one recess.

10. The hammer tacker of claim 1, wherein each of the two side walls is divided by the stop point into a first section and a second section, a ratio of a first distance from the first position to the stop point to a length of the first section is 0.615 to 0.815, and a ratio of a second distance from the second position to the stop point to a length of the second section is 0.305 to 0.505.

* * * * *